J. O. TALMAGE.
Hand Corn-Planters.
No. 144,485. Patented Nov. 11, 1873.
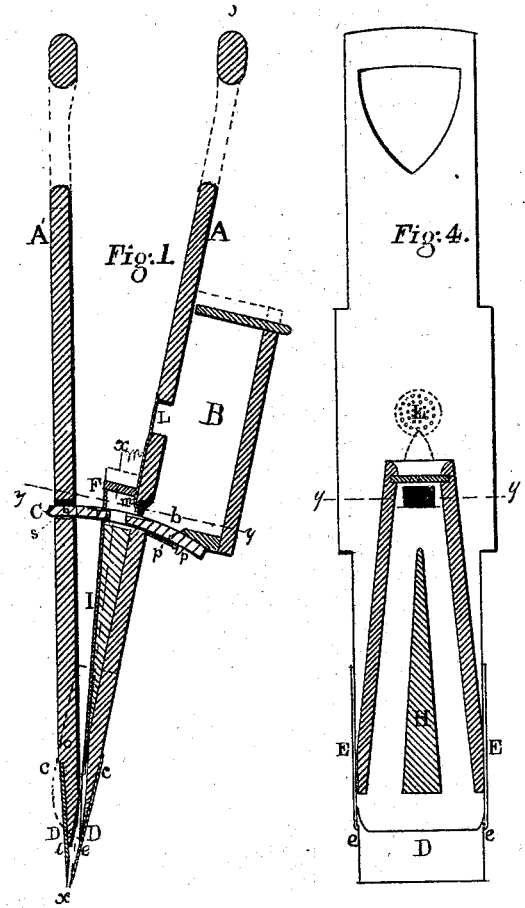

UNITED STATES PATENT OFFICE.

JACOB O. TALMAGE, OF CARDINGTON, OHIO.

IMPROVEMENT IN HAND CORN-PLANTERS.

Specification forming part of Letters Patent No. 144,485, dated November 11, 1873; application filed October 8, 1873.

*To all whom it may concern:*

Be it known that I, JACOB O. TALMAGE, of Cardington, Ohio, have invented a new and useful Improvement in Hand Corn-Planters, of which the following is a clear, full, and exact description, reference being had to the accompanying drawings making a part of this specification, in which—

Figure 1 is a vertical section. Fig. 2 is a horizontal section through the line y y. Fig. 3 represents different views of the seed-slide. Fig. 4 is a vertical section through the line x x.

My invention relates to corn-planters used by hand; and consists in the combination and arrangement of the several parts, as hereinafter described.

To enable others skilled in the art to make and use my invention, I will proceed to describe the manner in which I have carried it out.

In the accompanying drawings, A A' designate the handle-boards. On one of them, A, the seed-box B is constructed, having in its bottom and inside wall suitable openings, through which to insert the seed-slide C, and also the rectangular opening b, through which the seed pass from the seed-box to the seed-slide. The lower ends of the handle-boards A A' are beveled at c, and have secured thereto the plates D, which are rounded at e to prevent the seed from scattering, and to cause the plates the better to clear themselves of dirt. E represents the side plates, also bent at their lower ends to give strength to the plates D. The seed-slide C has the opening c', through which the seed pass to the ground. This slide is recessed, so as to admit the plate i, which is slotted, and is adjustable by means of the screw k, so that the opening c' may be enlarged or contracted at pleasure, and thus control and regulate the quantity of seed to be dropped at each operation of the planter. The slide C is also recessed on the side of the opening c', next the seed-box, as shown at c'' in Fig. 3. The acute angle of this recess serves to hold in position the seed which may have passed into the opening c', and not allow the scraper to remove seed below the surface of the seed-slide, which might be the case if the seed purposely scraped back be allowed to press against the seed in the opening c'. This tendency to remove the lower seed is overcome by the resistance of the seeds held in the angular recess. The seed-slide is also constructed with the pin p, which, as the planter opens to discharge the seed, comes in contact with the plate p', and produces a sudden jar to the dropper, which causes the seed-slide to clear itself of the seed held in the opening c'. Immediately above the seed-slide C is placed the scraper m, (see Fig. 1,) secured to the inner side of the handle-board A, and made of any suitable material, and its lower edge is turned in slightly toward the seed-box, to secure its better working in keeping back the surplus seed. To the bottom of the scraper m is attached a strip of rubber, or other elastic material. F represents a glass plate arranged above the seed-slide, at a point outside of the seed-box, where it discharges the seed, as shown in Figs. 1 and 2. By means of this glass the person using the planter can see at any time whether the seed-slide C is feeding, and doing its work properly, and also detect any cause of interruption. Below the seed-slide C, and immediately under the point where the slide discharges the seed to be planted, I place a wedge-shaped division, H, in the casing I, with the point upward, (see Fig. 4,) by which means I cause the grains dropped from the seed-slide C to scatter slightly, and not fall in a bunch. This I regard as an important feature of my improved planter. In the hand-board A, and opening into the feed-box, I construct a ventilator, L, (see Fig. 4,) and thus secure a freer movement among the seeds confined in the seed-box B. The seed-slide C is held in position by the pin s passing into the side of the hand-board A'.

Having thus described my invention, what I claim as new, and desire to secure by Letters Patent, is—

In a hand corn-planter, the seed-slide C, having its regulating-plate i and stop p, the scraper m, the glass plate F, division H, and ventilator L, in combination with the handle-boards A A' and seed-box B, all arranged and operated substantially as and for the purpose set forth.

JACOB O. TALMAGE.

Witnesses:
A. H. HINDMAN,
SETH COOK.